US011815163B2

(12) United States Patent
Kato et al.

(10) Patent No.: US 11,815,163 B2
(45) Date of Patent: Nov. 14, 2023

(54) SPEED REDUCER

(71) Applicant: Techno Dynamics, Inc., Shizuoka (JP)

(72) Inventors: Toshinao Kato, Shizuoka (JP); Hiroki Yagi, Shizuoka (JP); Hironori Tozuka, Shizuoka (JP)

(73) Assignee: TECHNO DYNAMICS, INC., Shizuoka (JP)

( * ) Notice: Subject to any disclaimer, the term of this patent is extended or adjusted under 35 U.S.C. 154(b) by 61 days.

(21) Appl. No.: 17/504,082

(22) Filed: Oct. 18, 2021

(65) Prior Publication Data

US 2022/0120339 A1  Apr. 21, 2022

(30) Foreign Application Priority Data

Oct. 19, 2020  (JP) ................................. 2020-175616

(51) Int. Cl.
*F16H 25/04* (2006.01)
*F16H 13/08* (2006.01)
*F16H 53/08* (2006.01)
*F16H 55/22* (2006.01)
*F16H 1/22* (2006.01)

(52) U.S. Cl.
CPC ............. *F16H 13/08* (2013.01); *F16H 1/225* (2013.01); *F16H 25/04* (2013.01); *F16H 53/08* (2013.01); *F16H 55/22* (2013.01)

(58) Field of Classification Search
CPC .......... F16H 1/225; F16H 25/04; F16H 53/08; F16H 55/22
USPC .......................................................... 74/425
See application file for complete search history.

(56) References Cited

U.S. PATENT DOCUMENTS

| 767,588 | A | * | 8/1904 | Moakler | ................. | F16H 1/166 |
| | | | | | | 74/464 |
| 3,850,051 | A | * | 11/1974 | Woltjen | ................. | B23Q 16/00 |
| | | | | | | 74/823 |

(Continued)

FOREIGN PATENT DOCUMENTS

| DE | 102017118262 A1 | 2/2019 |
| JP | 2008-149334 | 7/2008 |
| JP | 2018-109436 | * 7/2018 |

(Continued)

OTHER PUBLICATIONS

European Search Report dated Feb. 2, 2022.

*Primary Examiner* — William C Joyce
(74) *Attorney, Agent, or Firm* — Dickinson Wright PLLC

(57) ABSTRACT

A speed reducer including: an input shaft; a first barrel cam; a first output table; an intermediate shaft; a second cam; and a second output table, in the first output table, the plurality of first cam followers being provided concentrically around a rotation center position of the intermediate shaft, concerning a certain first cam follower among the plurality of first cam followers, when a center position of the certain first cam follower when the certain first cam follower has been moved to a farthest end on one side in the up-down direction is defined as a reference position, a center position of the first barrel cam being shifted to another side in the up-down direction with respect to the reference position, an engagement center position in the front-rear direction between an engagement start position and an engagement end position being shifted either of forward and rearward with respect to the reference position.

4 Claims, 8 Drawing Sheets

(56) References Cited

U.S. PATENT DOCUMENTS 4,297,919 A * 11/1981 Kuehnle .................. F16H 1/30
                                                      475/345
5,784,923 A *  7/1998 Kuehnle .................. F16H 1/30
                                                      475/345

FOREIGN PATENT DOCUMENTS

JP      2020060248 A      4/2020
WO      WO 94/22637    * 10/1994

* cited by examiner

VIEW ALONG ARROW A

| | SHIFTING IN DIAGONAL DIRECTION | SHIFTING IN UP-DOWN DIRECTION |
|---|---|---|
| DISTANCE G2 (UP-DOWN SHIFT AMOUNT) | 0.2 | 0.2 |
| DISTANCE G1 (FRONT-REAR SHIFT AMOUNT) | 0.2 | |
| TORQUE TRANSMISSION CAPACITY | 1.0 | 0.8 |

FIG. 7

SPEED REDUCER

RELATED APPLICATIONS

This application claims priority to Japanese Patent Application No. 2020-175616, filed Oct. 19, 2020, the entire contents of which are incorporated herein by reference in their entirety.

FIELD

The present disclosure relates to a speed reducer.

BACKGROUND

A speed reducer that reduces the rotation speed of a motor stepwise (e.g., in two steps) and outputs a rotation speed lower than the rotation speed of the motor is known (for example, see Japanese Patent Application Publication No. 2008-149334).

A known example of a speed reducer that performs speed reduction in two steps is a speed reducer that includes a barrel cam on the input shaft side and an output table having a plurality of cam followers on the output shaft side, and that reduces the rotation speed of the output table by engaging the barrel cam with the cam followers.

In this conventional speed reducer, in order to increase the torque transmission capacity as much as possible, the barrel cam and the cam followers are engaged at a position at the upper end portion or the lower end portion of the output table (cam followers).

According to this configuration, the input shaft is located at the upper end portion or the lower end portion, and therefore the attachment position of the drive unit (motor) also needs to be shifted to the upper end portion or the lower end portion, and it has been difficult to achieve compactness for the speed reducer.

On the other hand, if the attachment position of the drive unit (motor) is set closer to the center (closer to the central axis) in the up-down direction, the torque transmission capacity decreases as the distance between the shafts decreases.

BRIEF SUMMARY

The present disclosure has been made in view of the foregoing problems, and an object of the present disclosure is to provide a compact speed reducer.

One aspect of the present disclosure for achieving the above-described aspect is a speed reducer including: an input shaft that is provided extending along a front-rear direction and that is driven by a drive unit to rotate; a first barrel cam that is connected to the input shaft and that rotates as the input shaft rotates; a first output table that includes a plurality of first cam followers that engage with the first barrel cam, and that rotates due to rotation of the first barrel cam; an intermediate shaft that is connected to the first output table, that rotates as the first output table rotates, and that is provided extending along a left-right direction; a second cam that is connected to the intermediate shaft, and that rotates as the intermediate shaft rotates; and a second output table that includes a plurality of second cam followers that engage with the second cam, that rotates as the second cam rotates, and that has a rotation axis that extends in an up-down direction, in the first output table, the plurality of first cam followers being provided concentrically around a rotation center position of the intermediate shaft, concerning a certain first cam follower among the plurality of first cam followers, when a center position of the certain first cam follower when the certain first cam follower has been moved to a farthest end on one side in the up-down direction is defined as a reference position, a center position of the first barrel cam being shifted to another side in the up-down direction with respect to the reference position, an engagement center position in the front-rear direction between an engagement start position and an engagement end position being shifted either of forward and rearward with respect to the reference position, the engagement start position being a position where the first barrel cam and the first cam followers start engaging, the engagement end position being a position where the first barrel cam and the first cam followers stop engaging.

Features of the present disclosure other than the above will become clear by reading the description of the present specification with reference to the accompanying drawings.

According to the present disclosure, it is possible to provide a compact speed reducer.

BRIEF DESCRIPTION OF THE DRAWINGS

FIG. 6 is a diagram for describing the positional relationship between the first barrel cam 14 and first cam followers 20a.

FIG. 7 is a diagram showing shift amounts of the first barrel cam 14.

FIGS. 8A and 8B are diagrams showing an engagement start position Ks and an engagement end position Kf of the first barrel cam 14 and the first cam followers 20a.

DETAILED DESCRIPTION

Figure 1:
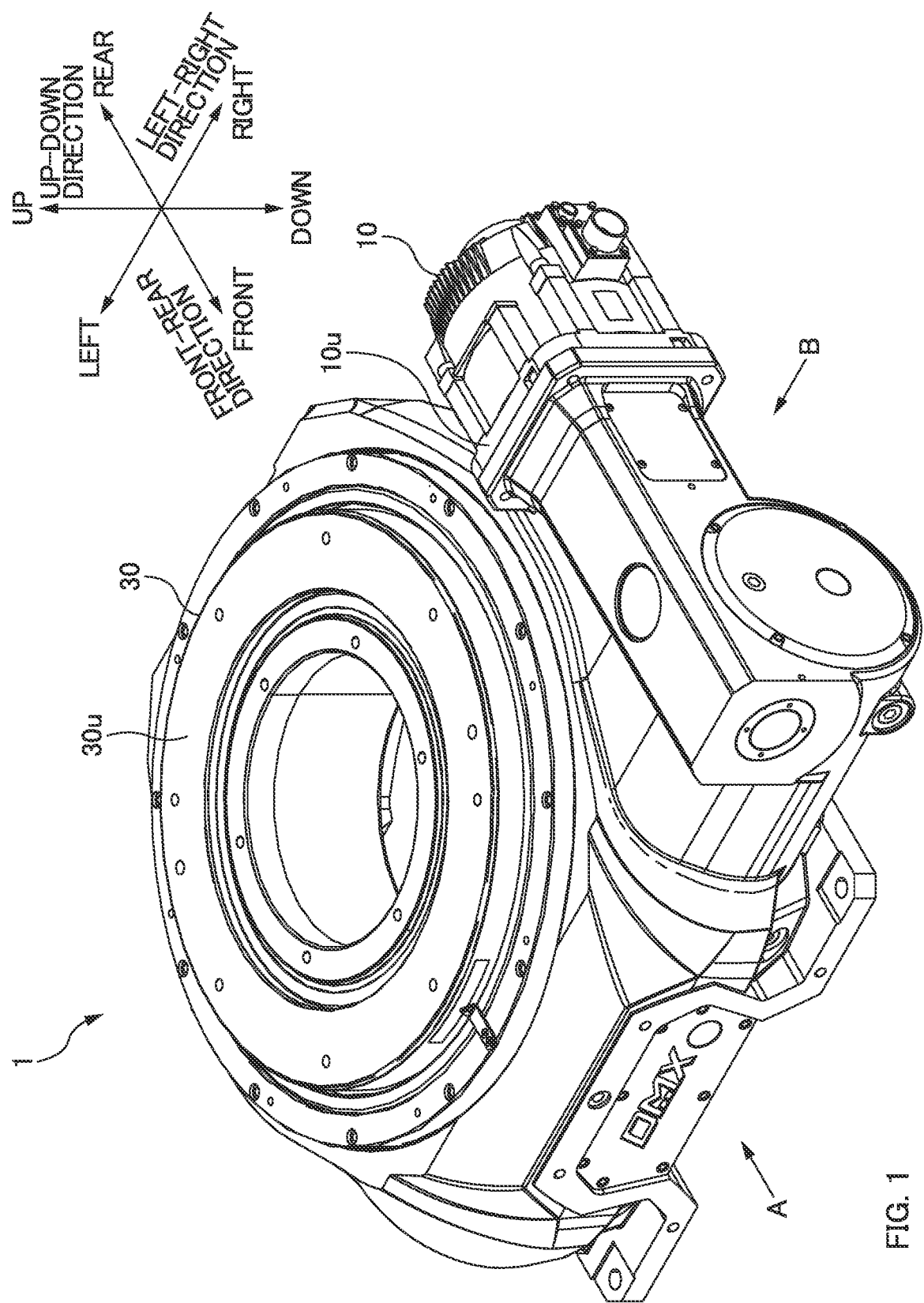
FIG. 1 is a perspective view of a speed reducer 1 according to an embodiment.

At least the following matters will become clear with the description of this specification and the attached drawings.

A speed reducer including: an input shaft that is provided extending along a front-rear direction and that is driven by a drive unit to rotate; a first barrel cam that is connected to the input shaft and that rotates as the input shaft rotates; a first output table that includes a plurality of first cam followers that engage with the first barrel cam, and that rotates due to rotation of the first barrel cam; an intermediate shaft that is connected to the first output table, that rotates as the first output table rotates, and that is provided extending along a left-right direction; a second cam that is connected to the intermediate shaft, and that rotates as the intermediate shaft rotates; and a second output table that includes a plurality of second cam followers that engage with the second cam, that rotates as the second cam rotates, and that has a rotation axis that extends in an up-down direction, in the first output table, the plurality of first cam followers being provided concentrically around a rotation center position of the intermediate shaft, concerning a certain first cam follower among the plurality of first cam followers, when a center position of the certain first cam follower when the certain first cam follower has been moved to a farthest end on one side in the up-down direction is defined as a reference position, a center position of the first barrel cam being shifted to another side in the up-down direction with respect to the reference position, an engagement center position in the front-rear direction between an engagement start position and an engagement end position being shifted either of forward and rearward with respect to the reference position, the engagement start position being a position where the first barrel cam and the first cam followers start engaging, the engagement end position being a position where the first barrel cam and the first cam followers stop engaging.

According to this speed reducer, the center of the first barrel cam in the up-down direction is shifted toward the intermediate shaft (inward), and thus the motor is less likely to protrude in the up-down direction, and the speed reducer can be easily made compact. Further, by shifting the axial center of the first barrel cam either forward or rearward, the first barrel cam and the first cam followers can be engaged with each other while also suppressing a decrease in torque transmission capacity. In other words, by shifting the first barrel cam in both the up-down direction and the front-rear direction (i.e., in a diagonal direction), the motor can be moved inward while also maintaining the torque transmission capacity, thus making it possible to provide a compact speed reducer.

In this speed reducer, it is desirable that an engagement center position in the front-rear direction between an engagement start position and an engagement end position is shifted either of forward and rearward with respect to the reference position, the engagement start position being a position where the first barrel cam and the first cam followers start engaging, the engagement end position being a position where the first barrel cam and the first cam followers stop engaging.

According to this speed reducer, the first barrel cam and the first cam followers can be engaged with each other, thus making it possible to provide a compact speed reducer.

In such a speed reducer, it is desirable that letting a distance between the rotation center position of the intermediate shaft and the reference position be 1, a distance in the up-down direction between a center position of the first barrel cam and the reference position is 0.2 or less, and a distance in the front-rear direction between the engagement center position of the first barrel cam and the reference position is 0.2 or less.

According to this speed reducer, the motor can be moved inward while also maintaining the torque transmission capacity.

In such a speed reducer, it is desirable that the drive unit can be attached on a rear side in the front-rear direction with respect to the first barrel cam, and that the engagement center position of the first barrel cam is shifted rearward in the front-rear direction with respect to the reference position.

According to this speed reducer, the input shaft on the motor side can be shorter than in the case where the engagement center position of the first barrel cam is shifted forward with respect to the reference position, and thus the rigidity of the input shaft on the motor side can be increased.

In such a speed reducer, it is desirable that in the up-down direction, the engagement center position of the first barrel cam is located upward with respect to the rotation center position of the intermediate shaft.

According to this speed reducer, the amount of downward protrusion of the motor can be suppressed in comparison with the case where the plurality of second cam followers engage with the second cam at a position downward with respect to the intermediate shaft. As a result, it becomes less necessary to extend downward its leg portions for arranging the speed reducer, thus making it possible to provide a compact speed reducer.

In such a speed reducer, it is desirable that the plurality of second cam followers engage with the second cam at a position upward in the up-down direction with respect to the intermediate shaft, and that a center position of the input shaft is located upward in the up-down direction with respect to a center position of the second cam followers.

According to this speed reducer, the distance between the intermediate shaft and the input shaft can be longer than in the case where the center position of the input shaft is located downward with respect to the center position of the second cam followers, and thus the reduction ratio can be increased.

In such a speed reducer, it is desirable that when the drive unit is attached, an upper end of the second output table is located upward in the up-down direction with respect to an upper end of the drive unit.

According to this speed reducer, interference with a motor can be suppressed in the case where a large work table is disposed on the upper surface of the second output table.

Speed Reducer 1

A speed reducer 1 according to the present embodiment will be described below with reference to the drawings.

Figure 2:
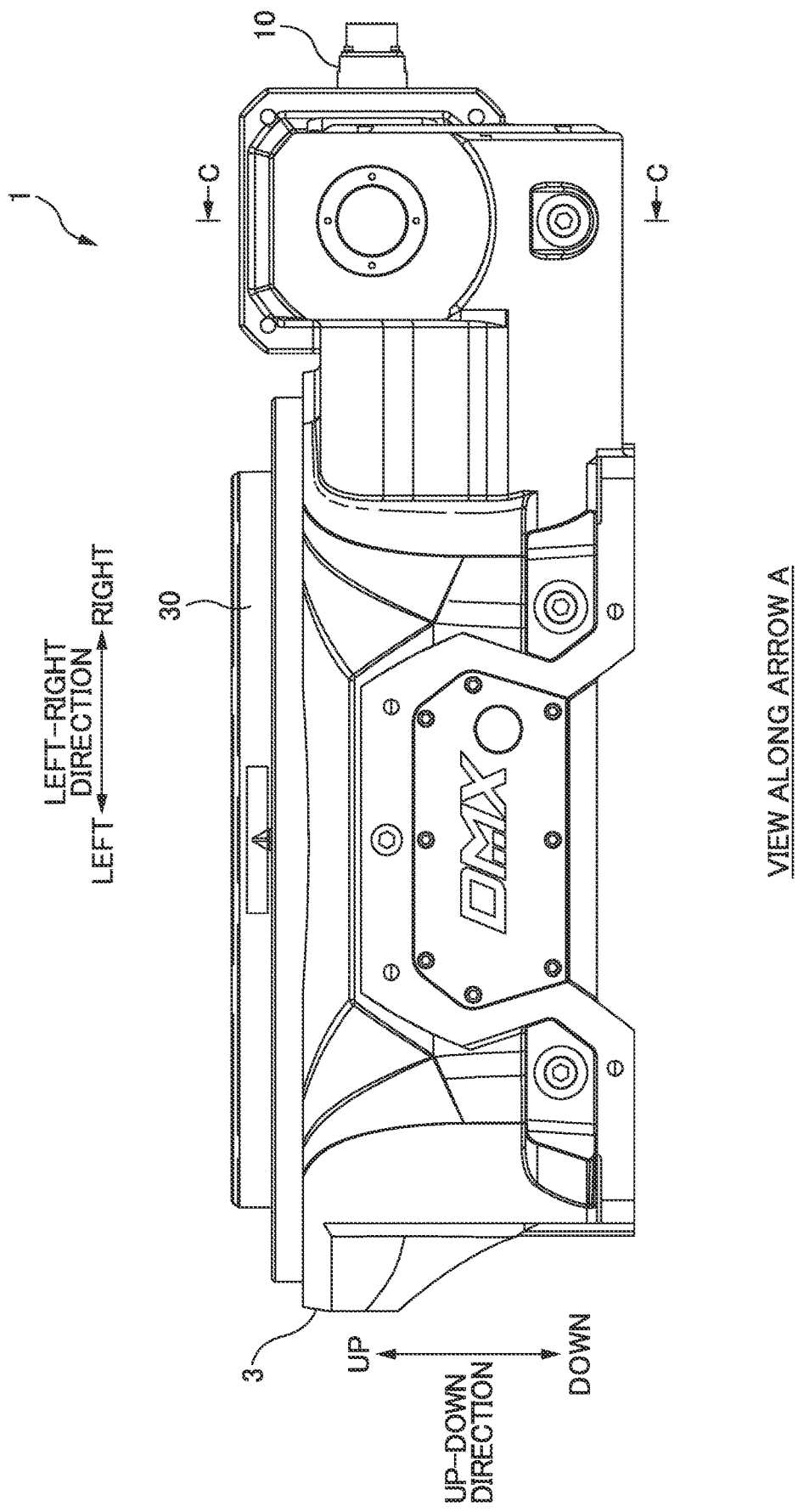
FIG. 2 is a view along an arrow A in FIG. 1, and is a front view of the speed reducer 1.
Figure 3:
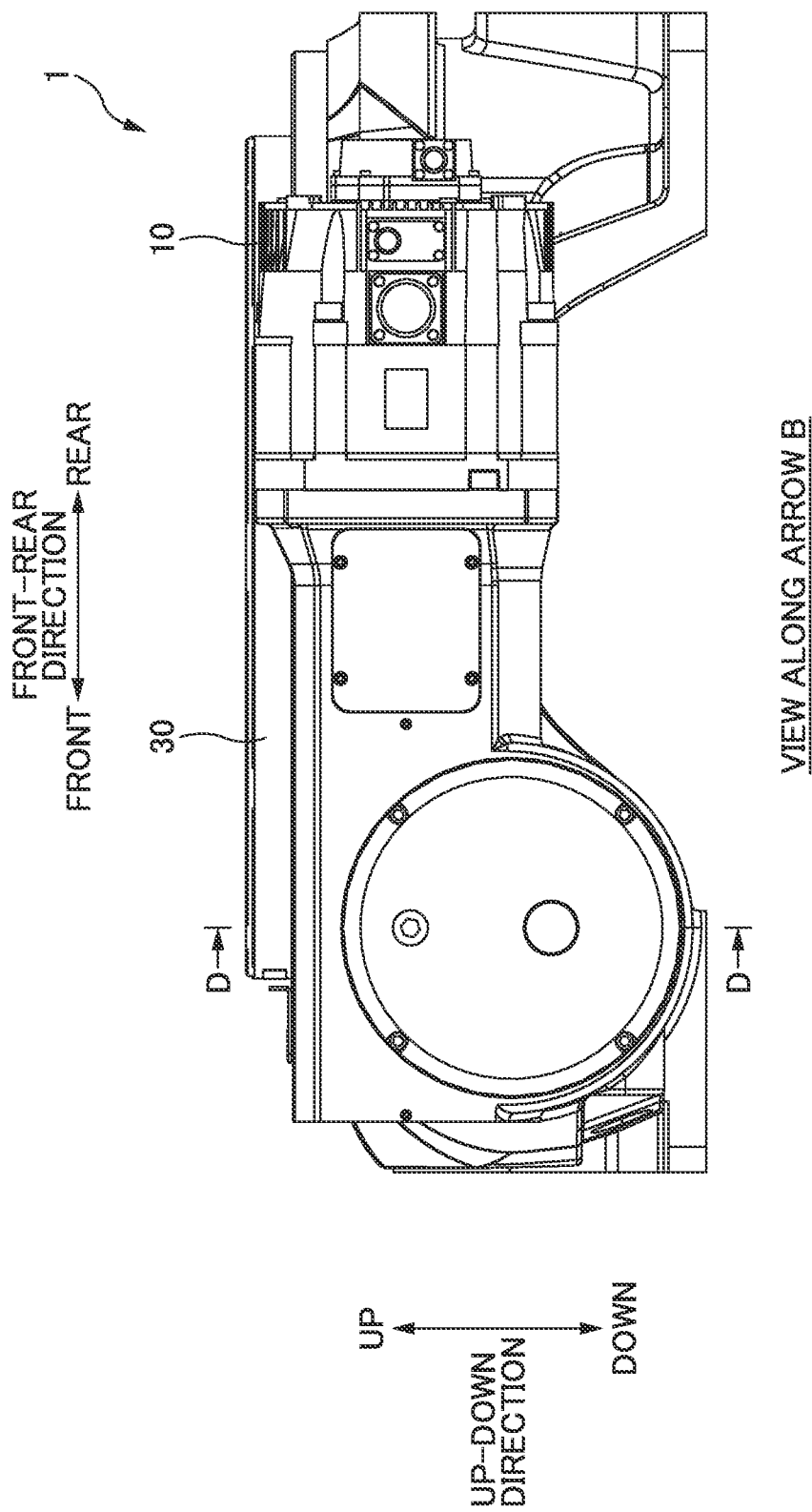
FIG. 3 is a view along an arrow B in FIG. 1, and is a right side view of the speed reducer 1.
Figure 4:
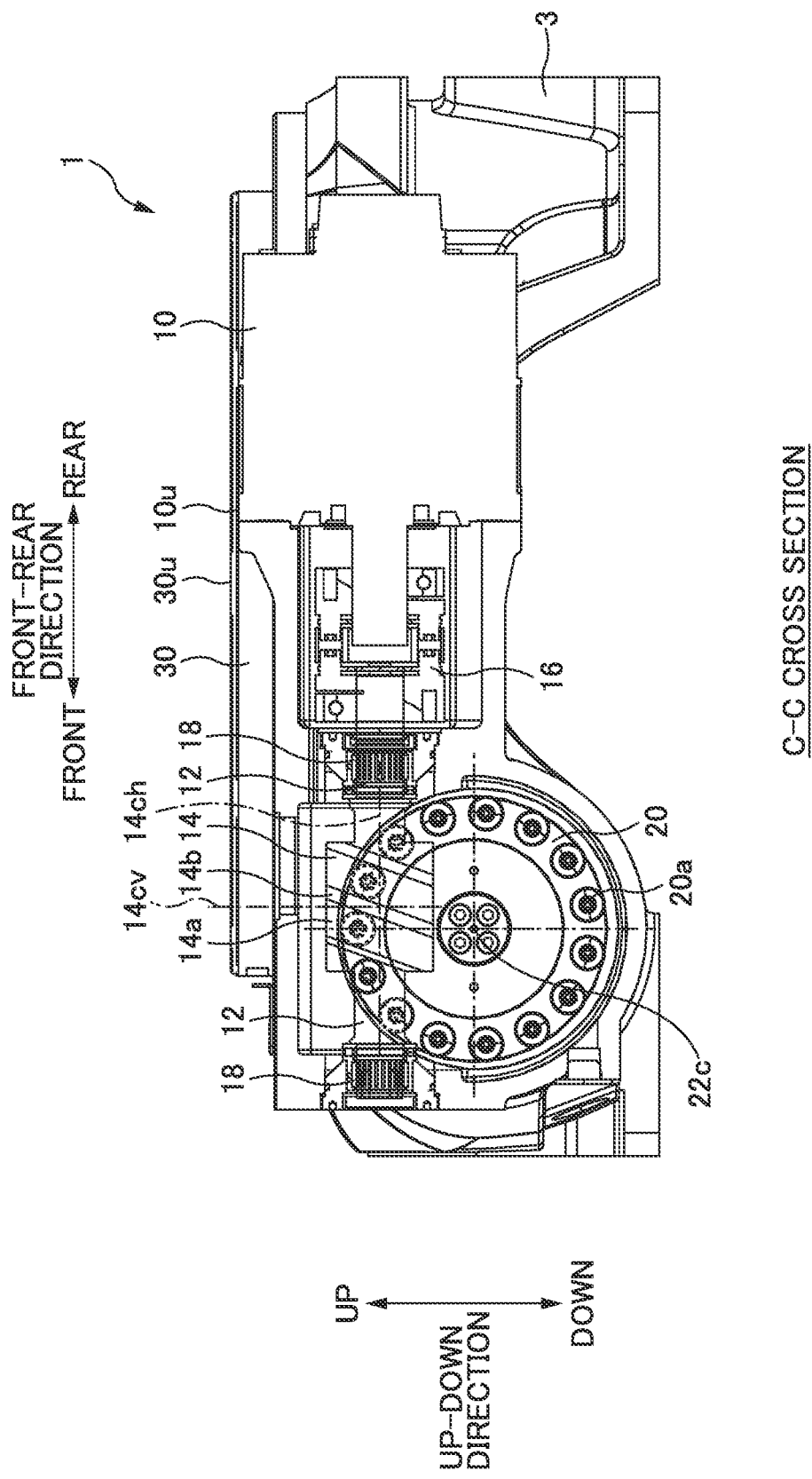
FIG. 4 is a cross-sectional view taken along a line C-C in FIG. 2, and is a cross-sectional view of a first barrel cam 14.
Figure 5:
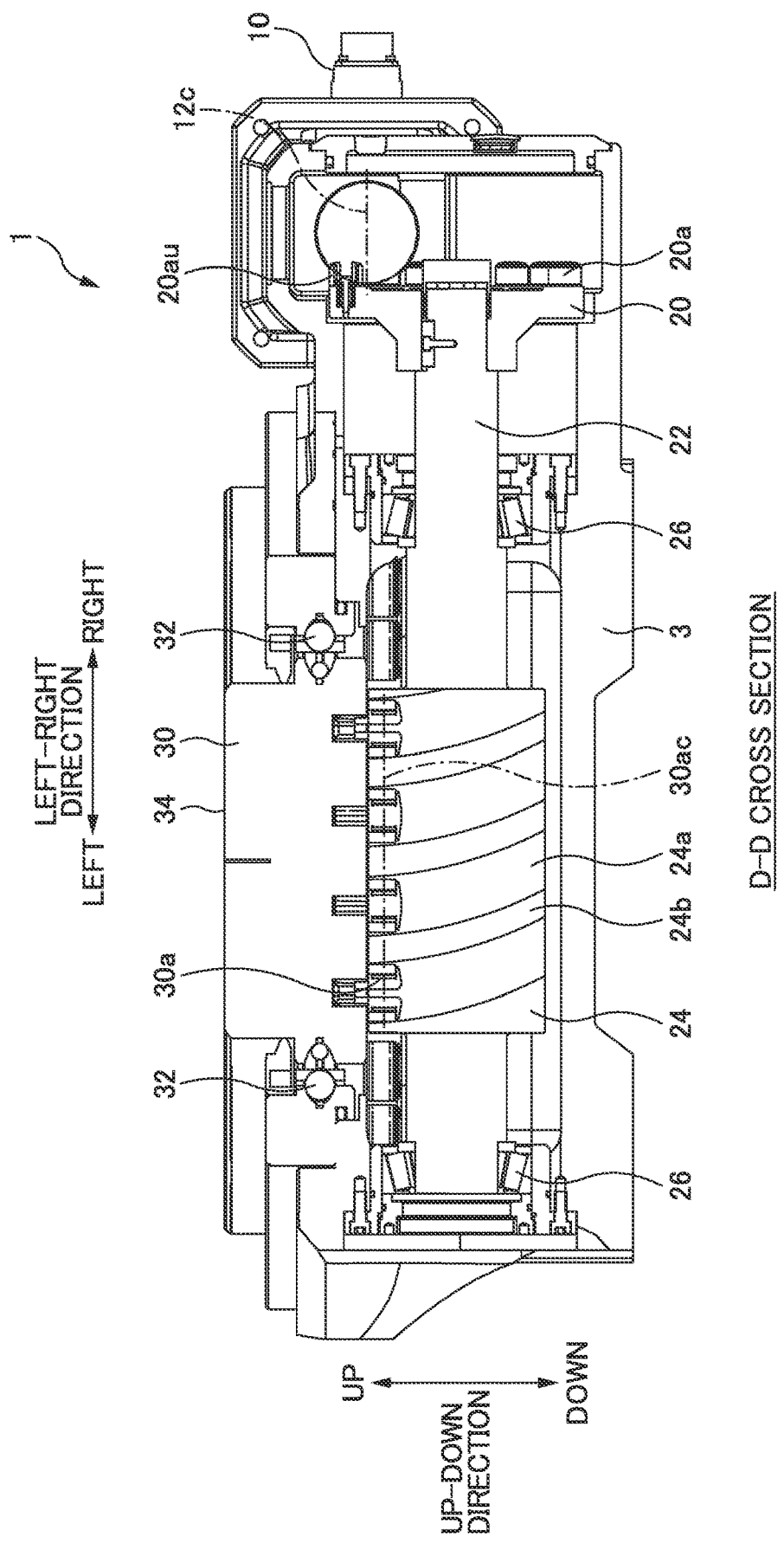
FIG. 5 is a cross-sectional view taken along a line D-D in FIG. 3, and is a cross-sectional view of a second cam 24.

FIG. 1 is a perspective view of the speed reducer 1 according to the present embodiment; FIG. 2 is a view along an arrow A in FIG. 1, and is a front view of the speed reducer 1; FIG. 3 is a view along an arrow B in FIG. 1, and is a right side view of the speed reducer 1; FIG. 4 is a cross-sectional view taken along a line C-C in FIG. 2, and is a cross-sectional view of a first barrel cam 14; and FIG. 5 is a cross-sectional view taken along a line D-D in FIG. 3, and is a cross-sectional view of a second cam 24. Note that in the drawings pertaining to the present embodiment, members may have been omitted as appropriate in order to describe the present disclosure in an easy-to-understand manner.

As shown in FIGS. 1 to 5, the speed reducer 1 according to the present embodiment has a front-rear direction, a left-right direction, and an up-down direction that intersect each other. In FIG. 4, letting the lateral direction of the paper surface be the front-rear direction, the left side (right side) of the paper surface will be called the front (rear) side, and letting the longitudinal direction of the paper surface be the up-down direction, the far side (near side) of the paper surface will be called the upper (lower) side. Also, in FIG. 5, letting the lateral direction of the paper surface be the left-right direction, the left side (right side) of the paper surface will be called the left (right) right.

A motor 10 (corresponding to a drive unit) can be attached to the speed reducer 1 as a motive power source. The speed reducer 1 is a device that causes a second output table 30 to rotate at a rotation speed that is lower than the rotation speed of the motor 10 (the reduction in rotation speed results in an increase in output torque). As a mechanism for reducing the rotation speed of the motor 10, the speed reducer 1 uses a two-step cam mechanism that includes a first barrel cam 14 (input-side speed-reduction mechanism) and a second cam 24 (output-side speed-reduction mechanism).

The speed reducer 1 has a housing 3, and as shown in FIGS. 4 and 5, at least an input shaft 12, the first barrel cam 14, a first output table 20, an intermediate shaft 22, and the second cam 24 are housed inside the housing 3.

The motor 10 is provided rightward and rearward of the housing 3, and its drive shaft is provided extending along the front-rear direction. As shown in FIG. 4, the drive shaft of the motor 10 is coupled to the input shaft 12 by a coupling 16.

The input shaft 12 is provided extending along the front-rear direction, and is rotatably supported by an input shaft bearing 18. The rear side of the input shaft 12 extends rearward beyond the input shaft bearing 18, and the extending portion is coupled to the drive shaft of the motor 10 by the coupling 16. In other words, the input shaft 12 is provided extending along the front-rear direction and is driven by the motor 10 to rotate.

Also, the input shaft 12 is provided at both the front and rear ends of the first barrel cam 14 in the front-rear direction, and the first barrel cam 14 and the input shaft 12 rotate integrally. In other words, the first barrel cam 14 is connected to the input shaft 12 and rotates as the input shaft 12 rotates.

Also, the first barrel cam 14 has a first cam groove 14a and a first cam rib 14b, and the spiral first cam groove 14a is provided extending along the axial direction of the input shaft 12. When first cam followers 20a of the first output table 20, which will be described later, are engaged with the first cam rib 14b, the rotation of the first barrel cam 14 is transmitted to the first output table 20. Note that the input shaft 12 and the first barrel cam 14 may be integrated by joining together separately processed components, or may be manufactured by forming a cam groove in an integrally manufactured shaft-shaped component.

The first output table 20 has a circular shape, includes a plurality of first cam followers 20a that engage with the first barrel cam 14 (first cam rib 14b), and rotates around the intermediate shaft 22 due to rotation of the first barrel cam 14 around the input shaft 12, the intermediate shaft 22 extending along the left-right direction, the input shaft 12 extending along the front-rear direction.

The first cam followers 20a are portions that engage with the first cam rib 14b, and are cylindrical rotating bodies that can rotate. The first cam followers 20a are arranged such that the rotation axis direction conforms to the left-right direction. A plurality of the first cam followers 20a are provided at equal intervals along a circle centered on a rotation center position 22c of the intermediate shaft 22 (i.e., concentrically). In other words, in the first output table 20, a plurality of first cam followers 20a are provided concentrically around the rotation center position 22c of the intermediate shaft 22. In the present embodiment, 15 first cam followers 20a are provided at equal intervals (every 24 degrees).

Also, as described above, the first cam followers 20a are engaged with the first cam rib 14b of the first barrel cam 14, and the engaged first cam followers 20a are guided by the first cam rib 14b so as to rotate and move.

Specifically, when the first barrel cam 14 rotates clockwise in a view from the rear side in the front-rear direction, the engaged first cam followers 20a are guided by the spiral first cam rib 14b to move rearward in the front-rear direction along the circumferential direction of the first output table 20. Specifically, the first output table 20 rotates clockwise in a view from the right side in the left-right direction (in a view from the side shown in FIG. 4). In other words, the first output table 20 includes a plurality of first cam followers 20a that engage with the first barrel cam 14, and rotates due to rotation of the first barrel cam 14.

In order to make the rotation of the first output table 20 highly accurate, that is to say in order to realize highly accurate output, the first cam followers 20a and the first cam rib 14b are engaged with high accuracy such that backlash, displacement, rattling, and the like do not occur.

As shown in FIG. 5, the intermediate shaft 22 is provided extending along the left-right direction and is rotatably supported by an intermediate shaft bearing 26. The first output table 20 is coupled to the right side of the intermediate shaft 22, and the first output table 20 and the intermediate shaft 22 rotate integrally. In other words, the intermediate shaft 22 is connected to the first output table 20 and rotates as the first output table 20 rotates.

Also, the intermediate shaft 22 is provided at both left and right ends of the second cam 24 in the left-right direction, and the second cam 24 and the intermediate shaft 22 rotate integrally. In other words, the second cam 24 is connected to the intermediate shaft 22 and rotates as the intermediate shaft 22 rotates.

The second cam 24 is a barrel cam and has a second cam groove 24a and a second cam rib 24b, and the spiral second cam groove 24a is provided extending along the axial direction of the intermediate shaft 22. When the second cam followers 30a of the second output table 30 are engaged with the second cam rib 24b, the rotation of the second cam 24 is transmitted to the second output table 30. Details of this are the same as that of the first cam rib 14b and the first cam followers 20a described above, and thus will not be described here.

As shown in FIG. 1, the second output table 30 has a hollow circular (doughnut-shaped) tubular shape, and is provided extending along the up-down direction. In other words, the rotation axis of the second output table 30 extends along the up-down direction, and the second output table 30 is rotatably supported by a second output table bearing 32. In other words, the second output table 30 includes a plurality of second cam followers 30a that engage with the second cam 24 (second cam rib 24b), rotates as the second cam 24 rotates, and has a rotation axis that extends in the up-down direction.

The second cam followers 30a are portions that engage with the second cam rib 24b, and are cylindrical rotating bodies that can rotate. The second cam followers 30a are arranged such that the rotation axis direction conforms to the up-down direction. A plurality of the second cam followers 30a are provided at equal intervals along a circle centered on a rotation center position (rotation axis position) of the second output table 30 (i.e., concentrically). In the present embodiment, 24 second cam followers 30a are provided at equal intervals (every 15 degrees).

Arrangement of First Barrel Cam 14

Figure 6:
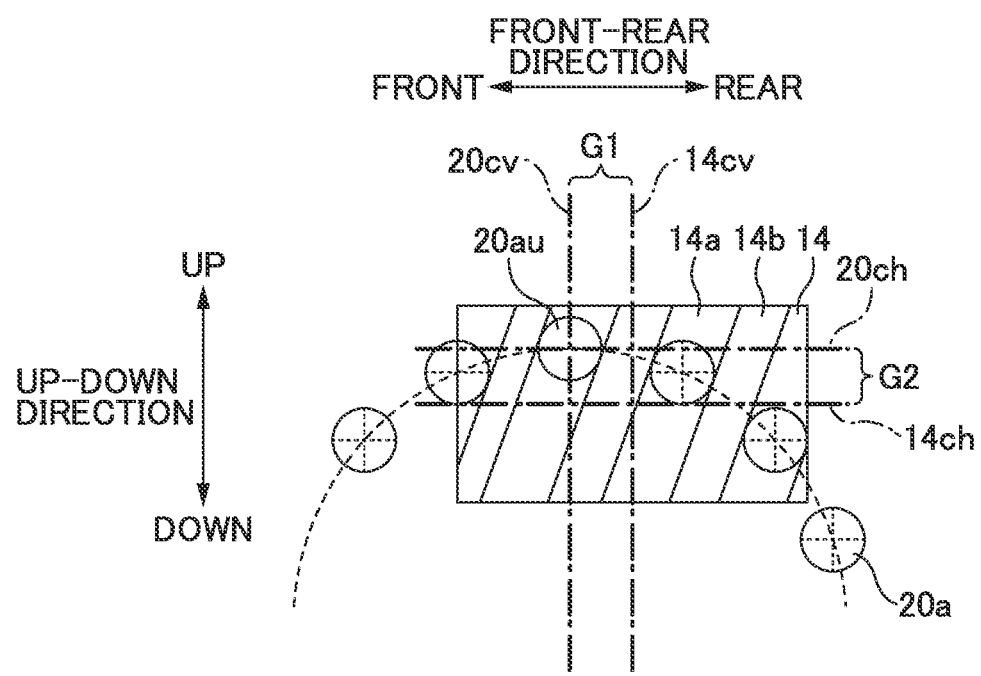

Next, the arrangement of the first barrel cam 14 according to the present embodiment will be described with reference to FIG. 6. FIG. 6 is a diagram for describing the positional relationship between the first barrel cam 14 and the first cam followers 20a.

Note that FIG. 6 shows a state when a certain first cam follower 20au has been moved to the uppermost position in order to fix the positions of the first cam followers 20a. Also, the center of the certain first cam follower 20au in the up-down direction is a center position 20ch, the center in the front-rear direction is a center position 20cv, and the center positions 20ch and 20cv of the certain first cam follower 20au are used as reference positions.

In the present embodiment, as shown in FIG. 6, in the up-down direction, a center position 14ch of the first barrel cam 14 is located downward of the reference position (center position 20ch) by a distance G2, and the first barrel cam 14 has been shifted downward from the reference position.

Specifically, concerning the certain first cam follower 20au among the plurality of first cam followers 20a, letting the reference position be the center position of the certain first cam follower 20*au* when the certain first cam follower 20*au* has been moved to the farthest end on one side (upward) in the up-down direction, the center position 14*ch* of the first barrel cam 14 is shifted to the other side (downward) in the up-down direction with respect to the reference position (center position 20*ch*).

Accordingly, the center position 14*ch* of the first barrel cam 14 in the up-down direction can be shifted toward the rotation center position 22*c* of the intermediate shaft 22 (can be shifted inward). Therefore the input shaft 12 can be provided at a position that has been shifted inward, and the motor 10 connected thereto can be provided at an inward position. In other words, the motor 10 can be prevented from protruding in the up-down direction, thus making it possible to provide a compact speed reducer 1.

Note that in the present embodiment, the first barrel cam 14 is engaged with the first cam followers 20*a* on the upper side (above the rotation center position 22*c*) in the up-down direction. But the first barrel cam 14 may be engaged with the first cam followers 20*a* on the lower side.

Also, in the present embodiment, an engagement center position 14*cv* in the front-rear direction (in the front-rear direction, the center position between an engagement start position Ks and an engagement end position Kf where the first cam rib 14*b* and the first cam followers 20*a* start and stop engaging; see FIG. 8; described in detail later) is located rearward with respect to the reference position (center position 20*cv*) by a distance G1.

In other words, in the front-rear direction, the engagement center position 14*cv* between the engagement start position Ks and the engagement end position Kf where the first barrel came 14 and the first cam followers 20*a* start and stop engaging is shifted rearward with respect to the reference position (center position 20*cv*).

Accordingly, the first barrel cam 14 is provided at a position that is shifted diagonally (rearward and downward), and therefore the first barrel cam 14 and the first cam followers 20*a* can be engaged with each other without significantly changing the arrangement diameter of the first cam followers 20*a* (the distance between the first cam followers 20*a* and the rotation center position 22*c*). In other words, because the arrangement diameter of the first cam followers 20*a* does not change significantly, the first barrel cam 14 and the first cam followers 20*a* can be engaged with each other while also suppressing a decrease in torque transmission capacity.

Note that the case where the first barrel cam 14 is arranged at a position that is shifted diagonally is not limited to being the case where the first barrel cam 14 is shifted diagonally rearward and downward, and the first barrel cam 14 may be shifted forward and downward, or may be engaged on the lower side and shifted rearward and upward, for example.

Upper Limits of Shift Amounts of First Barrel Cam 14

Next, the upper limits of the amounts by which the first barrel cam 14 is shifted (distance G1 and distance G2) in the up-down direction and the front-rear direction will be described. FIG. 7 is a diagram showing shift amounts of the first barrel cam 14, and shows upper limit values for shifting in a diagonal direction. The results for shifting only in the up-down direction are also shown as a comparative example. Note that these results (the upper limits of shift amounts) are based on cam analysis results, and have been determined based on the results of analyzing the followings: a reduction in torque transmission capacity from the direction of force that changes when diagonal shifting is performed for example; an increase in damage to the first cam followers 20*a*; and the like.

The numerical values of the distances G1 and G2 shown in FIG. 7 are numerical values indicating how much the distances G1 and G2 correspond to in the case of using 1.0 as the arrangement radius of the first cam followers 20*a* (the distance between the rotation center position 22*c* of the intermediate shaft 22 and the center positions of the first cam followers 20*a*, which is 57.5 mm in the present embodiment). Also, the numerical values of the torque transmission capacity are numerical values indicating how much the torque transmission capacity corresponds to in the case of using a value of 1.0 for the conventional example and performing shifting in only the up-down direction or in a diagonal direction.

As shown in FIG. 7, the upper limit of the distance G2 (up-down shift amount) is 0.2 (11 mm in the present embodiment), and the upper limit of the distance G1 (front-back shift amount) is 0.2 (11 mm in the present embodiment). In other words, in the case of using 1 as the distance between the rotation center position 22*c* of the intermediate shaft 22 and the reference position, the distance G2 in the up-down direction between the center position 14*ch* of the first barrel cam 14 and the reference position (center position 20*ch*) is 0.2 or less, and the distance G1 in the front-rear direction between the engagement center position 14*cv* of the first barrel cam 14 and the reference position (center position 20*cv*) is 0.2 or less.

Next, when the torque transmission capacity in the case of diagonal shifting is compared with that in the conventional example (1.0), it can be seen that the torque transmission capacity is the same at 1.0. In other words, by setting the up-down shift amount of the first barrel cam 14 to 0.2 or less and setting the front-rear shift amount to 0.2 or less, the motor can be moved inward while also maintaining the torque transmission capacity.

Note that in the case of performing shifting by 0.2 (11 mm) in the up-down direction and not performing shifting (0 mm) in the front-rear direction, it is difficult to engage the first barrel cam 14 with the first cam followers 20*a* unless the arrangement diameter of the first cam followers 20*a* is reduced, and therefore the torque transmission capacity is 0.8, which is lower than 1.0 in the case of performing diagonal shifting.

Engagement Start Position Ks and Engagement End Position Kf of First Barrel Cam 14.

Figure 8B:
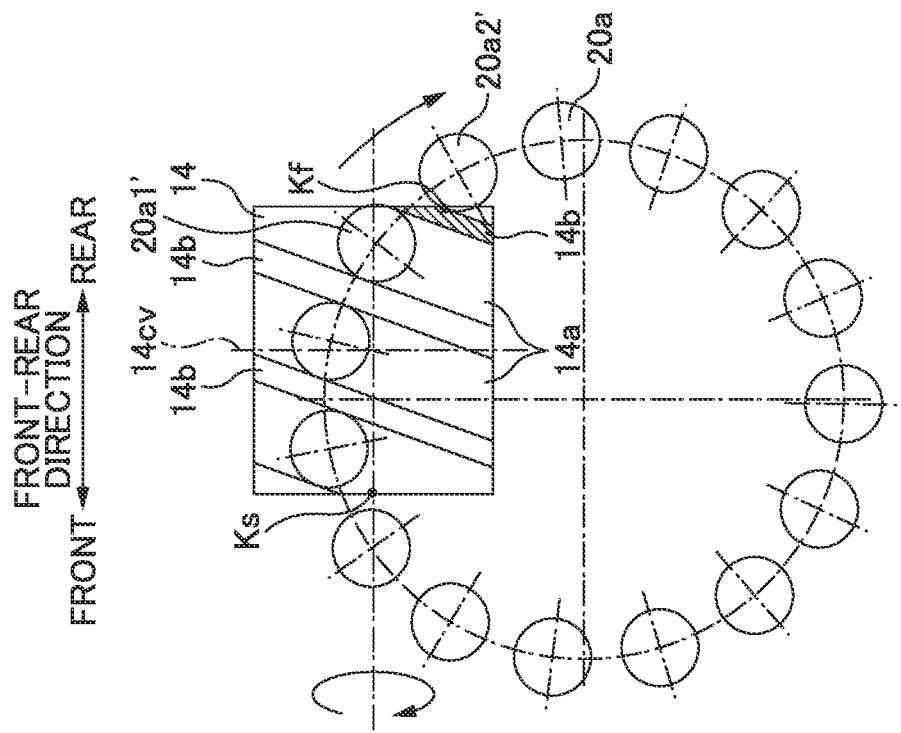
Figure 8A:
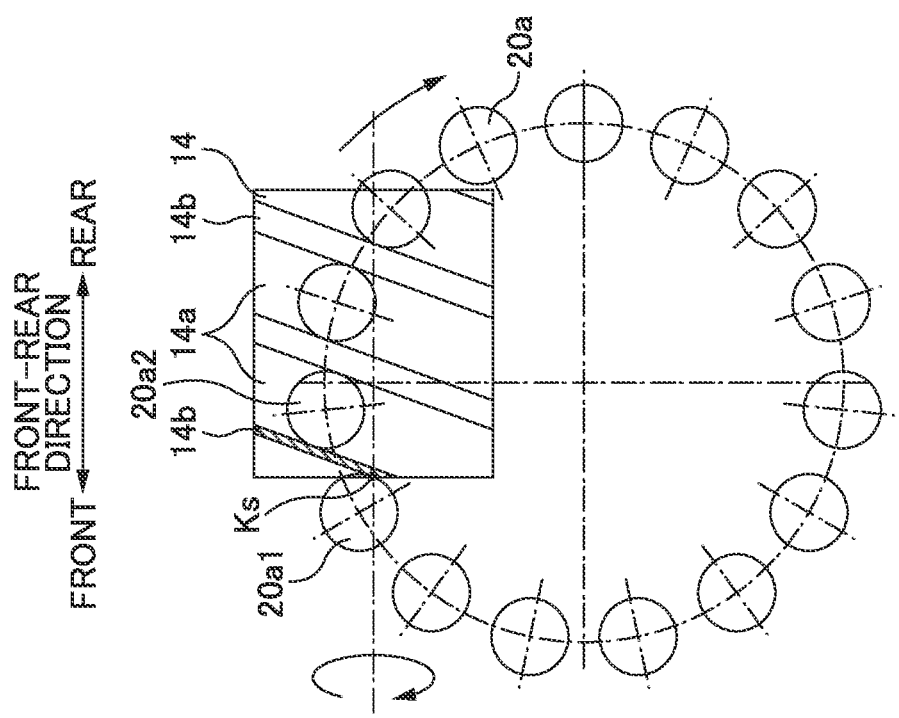

Next, the engagement start position Ks and the engagement end position Kf of the first cam rib 14*b* and the first cam followers 20*a* will be described. FIGS. 8A and 8B are diagrams showing the engagement start position Ks and the engagement end position Kf of the first barrel cam 14 and the first cam followers 20*a*. FIG. 8A shows the engagement start position Ks, and FIG. 8B shows the engagement end position Kf.

In the present embodiment, the first cam rib 14*b* and the first cam followers 20*a* are engaged due to the first cam rib 14*b* being sandwiched between two first cam followers 20*a* that are adjacent to each other in the rotation direction of the first output table 20.

First, in FIG. 8A, engagement is started when the first cam rib 14*b* shown by hatching is sandwiched between a first cam follower 20*a*1 and a first cam follower 20*a*2, the first cam follower 20*a*1 being one that is located on the frontmost side of the first barrel cam 14 in the front-rear direction, the first cam follower 20*a*2 being one that is adjacent to the rear side of the first cam follower 20*a*1. In this case, the engagement start position is the position Ks where the first cam rib 14b shown by hatching and the first cam follower 20a1 first come into contact with each other. In other words, the engagement start position Ks is the frontmost position in the front-rear direction among the positions where the first cam rib 14b comes into contact with the first cam followers 20a.

When the first barrel cam 14 in the state shown in FIG. 8A then rotates, the first cam followers 20a1 and 20a2 move rearward in the front-rear direction (rotate along the rotation direction of the first output table 20) while sandwiching the first cam rib 14b and being guided by the first cam rib 14b. Then, in FIG. 8B, when the positions of the first cam follower 20a1' and the first cam followers 20a2' are reached, the engagement ends, and thereafter the first cam follower 20a1' and the first cam follower 20a2' separate from the first cam rib 14b. In this case, the engagement end position is the position Kf where the first cam rib 14b shown by hatching and the first cam follower 20a2' were last in contact with each other. In other words, the engagement end position Kf is the rearmost position in the front-rear direction among the positions where the first cam rib 14b comes into contact with the first cam followers 20a.

Note that as shown in FIGS. 8A and 8B, the first barrel cam 14 according to the present embodiment is provided with the first cam rib 14b that is continuous from the front end to the rear end, and thus an engagement center position cv located at the center between the engagement start position Ks and the engagement end position Kf is approximately the center position of the first barrel cam 14 in the front-rear direction.

Positional Relationships of Parts and Efficacy Thereof

Next, the positional relationships of parts and the efficacy thereof in the present embodiment will be described. The positional relationships of parts described below include the positional relationship between the position where the first barrel cam 14 and the first cam followers 20a engage and the rotation center position 22c of the intermediate shaft 22, the positional relationship between the input shaft 12 and the second cam followers 30a, and the positional relationship between the second output table 30 and the motor 10.

With regards to the positional relationship between the position where the first barrel cam 14 and the first cam followers 20a engage and the rotation center position 22c of the intermediate shaft 22, when looking at the vertical positional relationship, as shown in FIG. 4, the position where the first barrel cam 14 and the first cam followers 20a engage is located upward with respect to the rotation center position 22c of the intermediate shaft 22. In other words, in the up-down direction, the engagement center position of the first barrel cam 14 is located upward with respect to the rotation center position 22c of the intermediate shaft 22.

Accordingly, the amount of downward protrusion of the motor 10 can be suppressed in comparison with the case where the first barrel cam 14 engages at a position downward with respect to the rotation center position 22c of the intermediate shaft 22. As a result, it becomes less necessary to extend downward its leg portions for arranging the speed reducer 1, thus making it possible to provide a compact speed reducer 1.

Next, looking at the positional relationship in the front-rear direction, as shown in FIG. 4, the center of the first barrel cam 14 in the front-rear direction is located rearward with respect to the rotation center position 22c of the intermediate shaft 22. Also, as described above, the motor 10 is attached on the rear side of the first barrel cam 14. In other words, the motor 10 can be attached rearward in the front-rear direction with respect to the first barrel cam 14, and the engagement center position 14cv of the first barrel cam 14 is shifted rearward in the front-rear direction with respect to the reference position (center position 20cv).

Accordingly, the input shaft 12 on the motor side (rear side) can be shorter than in the case where the first barrel cam 14 is shifted to the front side, and thus the rigidity of the input shaft 12 on the motor side (rear side) can be increased.

With regards to the positional relationship between the input shaft 12 and the second cam followers 30a, when looking at the positional relationship between the center position 12c of the input shaft 12 and a center position 30ac of the second cam followers 30a in the up-down direction, as shown in FIG. 5, the center position 12c of the input shaft 12 is located at a higher position. Since the second cam 24 is a barrel cam, the second cam followers 30a are engaged with the second cam 24 at a position upward of the intermediate shaft 22. In other words, the plurality of second cam followers 30a are engaged with the second cam 24 at a position upward in the up-down direction with respect to the intermediate shaft 22, and the center position 12c of the input shaft 12 is located upward in the up-down direction with respect to the center position 30ac of the second cam followers 30a.

Accordingly, the distance between the intermediate shaft 22 and the input shaft 12 can be set longer than in the case where the center position 12c of the input shaft 12 is located downward with respect to the center position 30ac of the second cam followers 30a, and thus the reduction ratio can be increased.

With regards to the positional relationship between the second output table 30 and the motor 10, when looking at the positional relationship between an upper end 30u of the second output table 30 and an upper end 10u of the motor 10 in the up-down direction, as shown in FIG. 4, the upper end 30u of the second output table 30 is located at a higher position. In other words, in the up-down direction, the upper end 30u of the second output table 30 is located upward with respect to the upper end 10u of the motor 10.

Accordingly, interference with the motor 10 can be suppressed in the case where a large work table or the like is disposed on the upper surface of the second output table 30.

Other Embodiments

Although the embodiment of the present disclosure has been described hereinabove, the above embodiment of the present disclosure is simply to facilitate understanding of the present disclosure and are not in any way to be construed as limiting the present disclosure. The present disclosure may variously be changed or altered without departing from its gist and encompass equivalents thereof.

Also, although the second cam 24 is a barrel cam in the above embodiment, the present disclosure is not limited to this, and it may be a roller gear cam, for example.

Also, in the above embodiment, the number of first cam followers 20a is 15 and the number of second cam followers 30a is 24, but the present disclosure is not limited to these numbers of cam followers.

Also, in the above embodiment, the engagement start position Ks of the first barrel cam 14 is on the front side and the engagement end position Kf is on the rear side, but the present disclosure is not limited to this. If the first barrel cam 14 is rotated in the opposite direction for example, the engagement start position Ks is on the rear side and the engagement end position Kf is on the front side.

REFERENCE SIGNS 1 speed reducer, 3 housing, 10 motor (drive unit), 10u upper end, 12 input shaft, 12c center position, 14 first barrel cam, 14a first cam groove, 14b first cam rib,
14ch center position, 14cv engagement center position, 16 coupling,
18 input shaft bearing, 20 first output table, 20a first cam follower,
20au certain first cam follower, 20ch center position (reference position),
20a1 front first cam follower, 20a2 rear first cam follower,
20cv center position (reference position), 22 intermediate shaft, 22c rotation center position,
24 second cam, 24a second cam groove, 24b second cam rib,
26 intermediate shaft bearing, 30 second output table,
30u upper end, 30a second cam follower, 30ac center position,
32 second output table bearing, G1 distance, G2 distance.

The invention claimed is:

1. A speed reducer comprising:
   an input shaft
      that is provided extending along a front-rear direction and
      that is driven by a drive unit to rotate;
   a first barrel cam
      that is connected to the input shaft and
      that rotates as the input shaft rotates;
   a first output table
      that includes a plurality of first cam followers that engage with the first barrel cam, and
      that rotates due to rotation of the first barrel cam;
   an intermediate shaft
      that is connected to the first output table,
      that rotates as the first output table rotates, and
      that is provided extending along a left-right direction;
   a second cam
      that is connected to the intermediate shaft, and
      that rotates as the intermediate shaft rotates; and
   a second output table
      that includes a plurality of second cam followers that engage with the second cam,
      that rotates as the second cam rotates, and
      that has a rotation axis that extends in an up-down direction,
   in the first output table, the plurality of first cam followers being provided concentrically around a rotation center position of the intermediate shaft,
   concerning a certain first cam follower among the plurality of first cam followers,
      when a center position of the certain first cam follower when the certain first cam follower has been moved to a farthest end on one side in the up-down direction is defined as a reference position,
         a center position of the first barrel cam being shifted to another side in the up-down direction with respect to the reference position,
   an engagement center position in the front-rear direction between an engagement start position and an engagement end position being shifted either of forward and rearward with respect to the reference position, wherein, in the up-down direction, the engagement center position of the first barrel cam is located upward with respect to the rotation center position of the intermediate shaft,
      the engagement start position being a position where the first barrel cam and the first cam followers start engaging,
      the engagement end position being a position where the first barrel cam and the first cam followers stop engaging.

2. A speed reducer according to claim 1, wherein
   the drive unit can be attached on a rear side in the front-rear direction with respect to the first barrel cam, and
   the engagement center position of the first barrel cam is shifted rearward in the front-rear direction with respect to the reference position.

3. A speed reducer according to claim 1, wherein
   the plurality of second cam followers engage with the second cam at a position upward in the up-down direction with respect to the intermediate shaft, and
   a center position of the input shaft is located upward in the up-down direction with respect to a center position of the second cam followers.

4. A speed reducer according to claim 1, wherein
   when the drive unit is attached,
      an upper end of the second output table is located upward in the up-down direction with respect to an upper end of the drive unit.

* * * * *